United States Patent Office
3,147,252
Patented Sept. 1, 1964

3,147,252
16α,17α-ACETAL AND KETAL DERIVATIVES OF THE PREGNANE SERIES
Patrick A. Diassi, Westfield, N.J., assignor to Olin Mathieson Chemical Corporation, New York, N.Y., a corporation of Virginia
No Drawing. Filed June 13, 1963, Ser. No. 287,512
8 Claims. (Cl. 260—239.55)

This invention relates to and has as its objects the provision of new physiologically active steroids, methods for preparing the same, and novel intermediates useful in said preparation.

The new final products of this invention may be represented by the formula

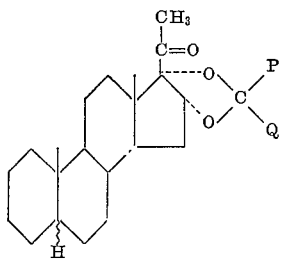

wherein P is lower alkyl, halo(lower alkyl), monocyclic cycloalkyl, monocyclic aryl, monocyclic aryl-lower alkyl, monocyclic cycloalkyl-lower alkyl, monocyclic heterocylic or monocyclic heterocyclic-lower alkyl; Q is hydrogen, lower alkyl, halo lower alkyl, monocyclic cycloalkyl, monocyclic cycloalkyl lower alkyl, monocyclic aryl, monocyclic aryl-lower alkyl, monocyclic heterocyclic or monocyclic heterocyclic lower alkyl; or together with the carbon to which they are joined P and Q is monocyclic cycloalkyl or monocyclic heterocyclic.

(Whenever in this application and the claims appended thereto, a curved line [∫] is employed in the linkage of atoms in a formula, it is meant to denote that the connected atom may be in either the alpha or beta position as is determined in the respective compounds.)

The final products of this invention are physiologically active substances which possess progestational activity and hence can be used in lieu of known progestational agents, such as progesterone, in the treatment of habitual abortion. For this purpose, they can be administered in the same manner as progesterone, for example, the dosage being adjusted for the relative potency of the particular steroid. The compounds of this invention can also be administered perorally in the form of tablets.

In the most preferable embodiment of this invention P is lower alkyl and Q is selected from the group consisting of lower alkyl (e.g., methyl), monocyclic aryl (e.g., phenyl) and monocyclic heterocyclic (e.g., furyl).

The final products of this invention may be prepared according to the novel processes of this invention, which may be represented by the following equations wherein P and Q are as hereinbefore defined:

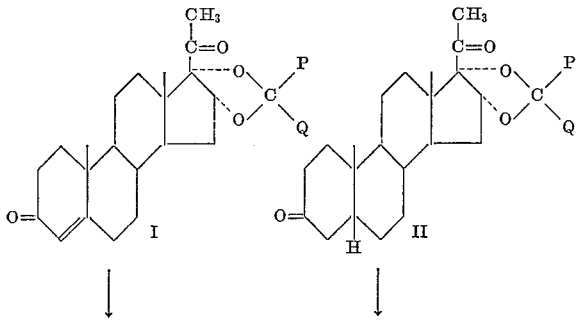

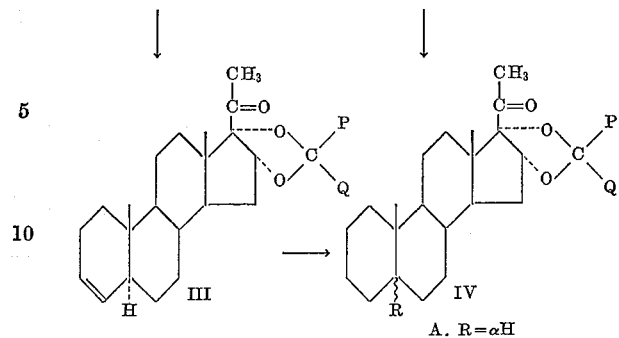

A. R=αH
B. R=βH

In the first step of the novel process of this invention the 16α,17α-acetal and ketal derivatives of 16,17-dihydroxyprogesterone (Compounds I) which may be prepared in accordance with the teachings and disclosures of U.S. Patent No. 3,008,958, issued November 14, 1961, in the names of Josef Fried and Patrick A. Diassi, and U.S. Patent No. 3,048,581, issued August 7, 1962, in the name of Josef Fried, are reduced, as by treatment with zinc dust and glacial acetic acid to yield the respective 16α,17α-acetal and ketal derivatives of $\Delta^3$-5α-pregnene-16α,17α-diol-20-one (Compounds III) which are new compounds of this invention.

The 16α,17α-acetal and ketal derivatives of $\Delta^3$-5α-pregnene-16α,17α-diol-20-one (Compounds III) may then be hydrogenated as by treatment with hydrogen in the presence of a palladium catalyst to yield the respective 16α,17α-acetal and ketal derivatives of 16α,17α-dehydroxy-20-keto-5α-pregnanes (Compounds IV) which are new final products of this invention.

Alternatively, Compounds IV (wherein P is βH) may be obtained directly, employing the 16α,17α-acetal and ketal derivatives of 5β-pregnane-16α,17α-diol-3,20-dione (Compounds II) prepared in accordance with the procedures set forth in U.S. Patent No. 3,008,958, issued November 14, 1961, in the names of Josef Fried and Patrick A. Diassi, as starting material. Compounds II are reduced as by treatment with zinc dust and glacial acetic acid, to yield the respective 16α,17α-acetal and ketal derivatives of 5β-pregnane-16α,17α-diol-20-one which are also new final products of this invention.

The invention may be further illustrated by the following examples, wherein the temperatures are in degrees centigrade unless otherwise noted.

EXAMPLE 1

*16α,17α-(β-Methyl-α-Phenylmethylenedioxy)-$\Delta^3$-5α-Pregnene-20-One*

A mixture of 1.0 g. of 16α,17α-(β-methyl-α-phenylmethylenedioxy)progesterone and 40 g. of zinc dust in 140 ml. of glacial acetic acid is heated at 80° C. with stirring for three hours. The mixture is filtered and washed with a few milliliters of acetic acid. One hundred grams of ice is then added to the combined filtrate and washings and the solution partially neutralized by the slow addition of 3 N sodium hydroxide. The mixture is then extracted with chloroform which is washed with water twice and evaporated to dryness in vacuo. Crystallization of the residue from 95% ethanol gives 440 mg. of 16α,17α-(β-methyl - α - phenylmethylenedioxy)-$\Delta^3$-5α-pregnene-20-one having a melting point of about 147–148°, $[\alpha]_D^{22}$ +20° (chloroform).

*Analysis.*—Calcd. for $C_{29}H_{38}O_3$: C, 80.14; H, 8.81. Found: C, 80.10; H, 8.80.

EXAMPLE 2

*16α,17α-Dimethylmethylenedioxy-$\Delta^3$-5α-Pregnene-20-One*

Following the procedure of Example 1 but substituting

16α,17α-dimethylmethylenedioxyprogesterone for 16α,17α-(β-methyl-α-phenylmethylenedioxy)progesterone, there is obtained 16α,17α-dimethylmethylenedioxy-Δ³-5α-pregnene-20-one.

EXAMPLE 3

16α,17α-(β-Methyl-α-Phenylmethylenedioxy)-5α-Pregnane-20-One

To a solution of 100 mg. of 16α,17α-(β-methyl-α-phenylmethylenedioxy)-Δ³-5α-pregnene-20-one in 20 ml. of ethyl acetate is added 63 mg. of 5% palladium on barium sulfate, and the mixture hydrogenated at room temperature at atmospheric pressure for 20 hours. The mixture is filtered and washed with ethyl acetate. The filtrate and washings are then evaporated to dryness in vacuo and the residue crystallized from 95% ethanol to give 90 mg. of 16α,17α - (β-methyl-α-phenylmethylenedioxy)-5α-pregnane-20-one having melting point 151–153° $[\alpha]_D^{22}$ +8.0° (chloroform).

*Analysis.*—Calcd. for $C_{29}H_{40}O_3$ (436.61): C, 79.77; H, 9.23. Found: C, 80.04; H, 9.35.

EXAMPLE 4

16α,17α-Dimethylmethylenedioxy-5α-Pregnane-20-One

Following the procedure of Example 3 but substituting 16α,17α-dimethylmethylenedioxy - Δ³ - 5α - pregnene-20-one for 16α,17α-(β-methyl-α-phenylmethylenedioxy)Δ³-5α-pregnene-20-one there is obtained 16α,17α-dimethylmethylenedioxy-5α-pregnane-20-one.

EXAMPLE 5

16α,17α-(β-Methyl-α-Phenylmethylenedioxy)-5β-Pregnane-20-One

To a solution of 500 mg. of 16α,17α-(β-methyl-α-phenylmethylenedioxy)-5β-pregnane-3,20-dione in 17 ml. of acetic acid there is added 20 g. of zinc dust and the mixture stirred at 80° for two hours. The zinc dust is filtered and washed with a few ml. of glacial acetic acid. The combined filtrate and washings are then poured onto 100 g. of ice and partially neutralized by the slow addition of 1 liter of 3 N sodium hydroxide. The mixture is then extracted with chloroform which is washed twice with water and evaporated to dryness in vacuo. Crystallization of the residue from 95% ethanol gives 300 mg. of 16α,17α-(β-methyl-α-phenylmethylenedioxy) - 5β - pregnane-20-one having melting point about 117–119°, $[\alpha]_D^{22}$ +7.9° (chloroform).

*Analysis.*—Calcd. for $C_{29}H_{40}O_3$ (436.61): C, 79.77; H, 9.23. Found: C, 79.69; H, 9.24.

EXAMPLE 6

16α,17α-Dimethylmethylenedioxy-5β-Pregnane-20-One

Following the procedure of Example 5 but substituting 16α,17α-dimethylmethylenedioxy - 5β - pregnane - 3,20-dione for 16α,17α - (β-methyl-α-phenylmethylenedioxy)-5β-pregnane-3,20-dione there is obtained 16α,17α-dimethylmethylenedioxy-5β-pregnane-20-one.

Similarly, if other 16α,17α-acetal and ketal derivatives of the starting materials of this invention are substituted therefor in the practice of this invention, the respective 16α,17α-acetal and ketal derivatives of the final products are obtained.

The invention may be variously otherwise embodied within the scope of the appended claims.

What is claimed is:
1. A compound of the formula

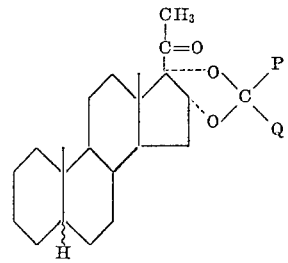

wherein P is selected from the group consisting of lower alkyl, halo(lower alkyl), monocyclic cycloalkyl, monocyclic aryl, monocyclic aryl-lower alkyl, monocyclic cycloalkyl-lower alkyl, monocyclic heterocyclic and monocyclic heterocyclic-lower alkyl; Q is selected from the group consisting of hydrogen, lower alkyl, halo lower alkyl, monocyclic cycloalkyl, monocyclic cycloalkyl lower alkyl, monocyclic aryl, monocyclic aryl-lower alkyl, monocyclic heterocyclic and monocyclic heterocyclic lower alkyl; and together with the carbon to which they are joined P and Q is selected from the group consisting of monocyclic cycloalkyl and monocyclic heterocyclic.

2. A compound of the formula

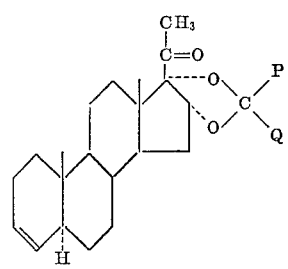

wherein P and Q are as defined in claim 1.

3. 16α,17α-(β-methyl - α - phenylmethylenedioxy)-Δ³-5α-pregnene-20-one.

4. 16α,17α-dimethylmethylenedioxy - Δ³ - 5α - pregnene-20-one.

5. 16α,17α-(β-methyl - α - phenylmethylenedioxy)-5α-pregnane-20-one.

6. 16α,17α-dimethylmethylenedioxy - 5α - pregnane-20-one.

7. 16α,17α-(β-methyl - α - phenylmethylenedioxy)-5β-pregnane-20-one.

8. 16α,17α - dimethylmethylenedioxy-5β-pregnane - 20-one.

No references cited.